United States Patent
Westerhoff et al.

(10) Patent No.: US 9,681,198 B2
(45) Date of Patent: Jun. 13, 2017

(54) DYNAMIC GENERATION OF TRICK MODE DATA

(71) Applicant: Roku, Inc., Saratoga, CA (US)

(72) Inventors: David Allen Westerhoff, Pleasanton, CA (US); Timothy John Granger, Cambridge (GB)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 14/840,962

(22) Filed: Aug. 31, 2015

(65) Prior Publication Data

US 2017/0064409 A1    Mar. 2, 2017

(51) Int. Cl.
*H04N 21/6587* (2011.01)
*H04N 21/239* (2011.01)
*H04N 21/4402* (2011.01)

(52) U.S. Cl.
CPC ..... *H04N 21/6587* (2013.01); *H04N 21/2393* (2013.01); *H04N 21/440218* (2013.01)

(58) Field of Classification Search
CPC combination set(s) only.
See application file for complete search history.

(56) References Cited

U.S. PATENT DOCUMENTS

| | | | |
|---|---|---|---|
| 7,197,234 B1 * | 3/2007 | Chatterton | G11B 27/28 348/E5.003 |
| 8,265,168 B1 | 9/2012 | Masterson et al. | |
| 8,826,337 B2 | 9/2014 | Issa et al. | |
| 2006/0280431 A1 | 12/2006 | Blattman et al. | |
| 2008/0310496 A1 * | 12/2008 | Fang | H04N 7/17336 375/240.01 |
| 2012/0210216 A1 * | 8/2012 | Hurst | H04N 21/23439 715/716 |
| 2014/0270720 A1 | 9/2014 | Wald et al. | |
| 2014/0359679 A1 * | 12/2014 | Shivadas | H04N 21/8455 725/90 |
| 2015/0067744 A1 | 3/2015 | Furtwangler | |

OTHER PUBLICATIONS

International Search Report and Written Opinion of the International Searching Authority for International Application No. PCT/US2016/049238, mailed Dec. 13, 2016, 13 pages.

* cited by examiner

*Primary Examiner* — Mulugeta Mengesha
(74) *Attorney, Agent, or Firm* — Sterne, Kessler, Goldstein & Fox P.L.L.C.

(57) ABSTRACT

System and method for generating trick mode data from streaming media content, are described. A media device receives streaming media content. During the streaming, the media device identifies a plurality of key frames from the media content, and also generates trick mode data from the plurality of key frames. The trick mode data generated during the streaming of the media content is used to perform a trick mode operation on the media content.

20 Claims, 9 Drawing Sheets

DYNAMIC GENERATION OF TRICK MODE DATA

FIELD

The field relates generally to trick mode data, and more specifically to generating trick mode data when streaming media content.

BACKGROUND

Media content may include secondary content which enables a viewer to perform a trick mode operation on the media content. However, not all media content includes the secondary content that enables trick mode. When the media content does not include secondary content, a viewer is unable to execute a trick mode operation when viewing media content.

BRIEF SUMMARY

System, method, and a computer program product embodiments, and combinations and sub-combinations thereof, for dynamically generating trick mode data, are disclosed. In an embodiment, media content is received on a media device. As the media content is streamed using the media device, a plurality of key frames are identified. The plurality of key frames are converted into trick mode data as the media device streams the media content. The media device uses the trick mode data to perform a trick mode operation.

In another embodiment, a computer program product embodiments, and combinations and sub-combinations thereof, for dynamically generating trick mode data, are disclosed. A first and second media device receive the same media content from a content server. The processor of the first media device generates a first key frame and the processor of the second media device generates a second key frame. The first key frame and the second key frame are uploaded to a server, where the server converts the first key frame and the second key frame into trick mode data. The first media device or the second media device can request the trick mode data to perform a trick mode operation.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for dynamically generating trick mode data while streaming media content on a media device. A media device uses trick mode data to perform trick mode operations. The trick mode operations include at least fast forward and rewind operations at one or more speeds.

Figure 1:
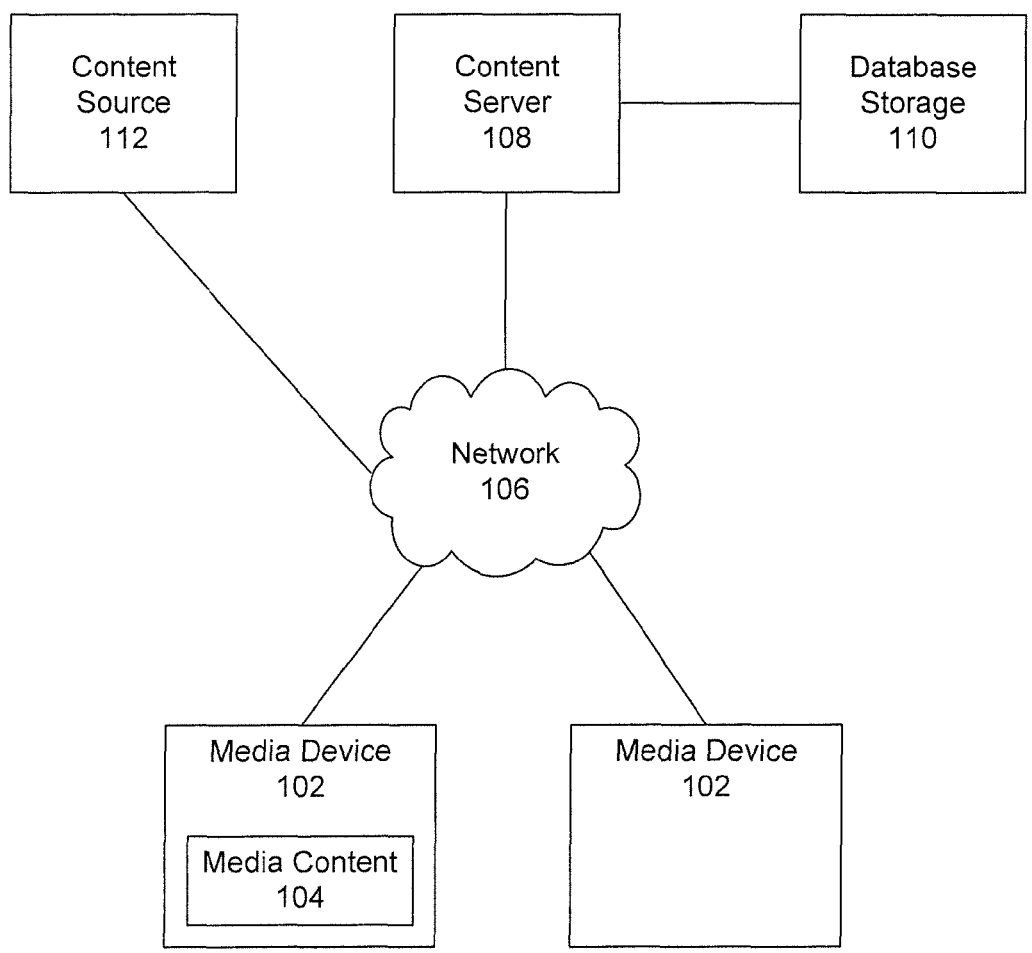
FIG. 1 is a block diagram of a system where example embodiments may be implemented.

FIG. 1 is a block diagram of a system 100 where example embodiments may be implemented. System 100 allows a viewer to perform trick mode operations on the streaming media content that is not enabled for trick mode operations. In an embodiment, the streaming media content is content which is transmitted or streamed over a network, such as the Internet. The streaming media content is also viewed on a streaming enabled electronic device at the same time as the streaming media content is streamed over the network. In an embodiment, the streaming media content may also be stored and viewed later.

In an embodiment, system 100 includes a media device 102. Example media device 102 may be a portable or non-portable electronic device, such as, a desktop, a laptop, a smartphone, a tablet, a data streaming device, such as, but not limited to, a streaming stick or a streaming player, a television set, a set-top box, or a media player to name a few non limiting examples. Media device 102 may also be a portable device that may be transported to different locations and be connected to a television set or another device that receives media content via media device 102 and displays the media content at one of these different locations.

In another example, media device 102 may be a data streaming device. A data streaming device receives, processes, and provides media content, including streaming media content, over a network for display on a television set or another media enabled display device that has, or is coupled to, a display screen. In yet another embodiment, media device 102 may be part of, or integrated with a television or another viewing device.

Figure 9:
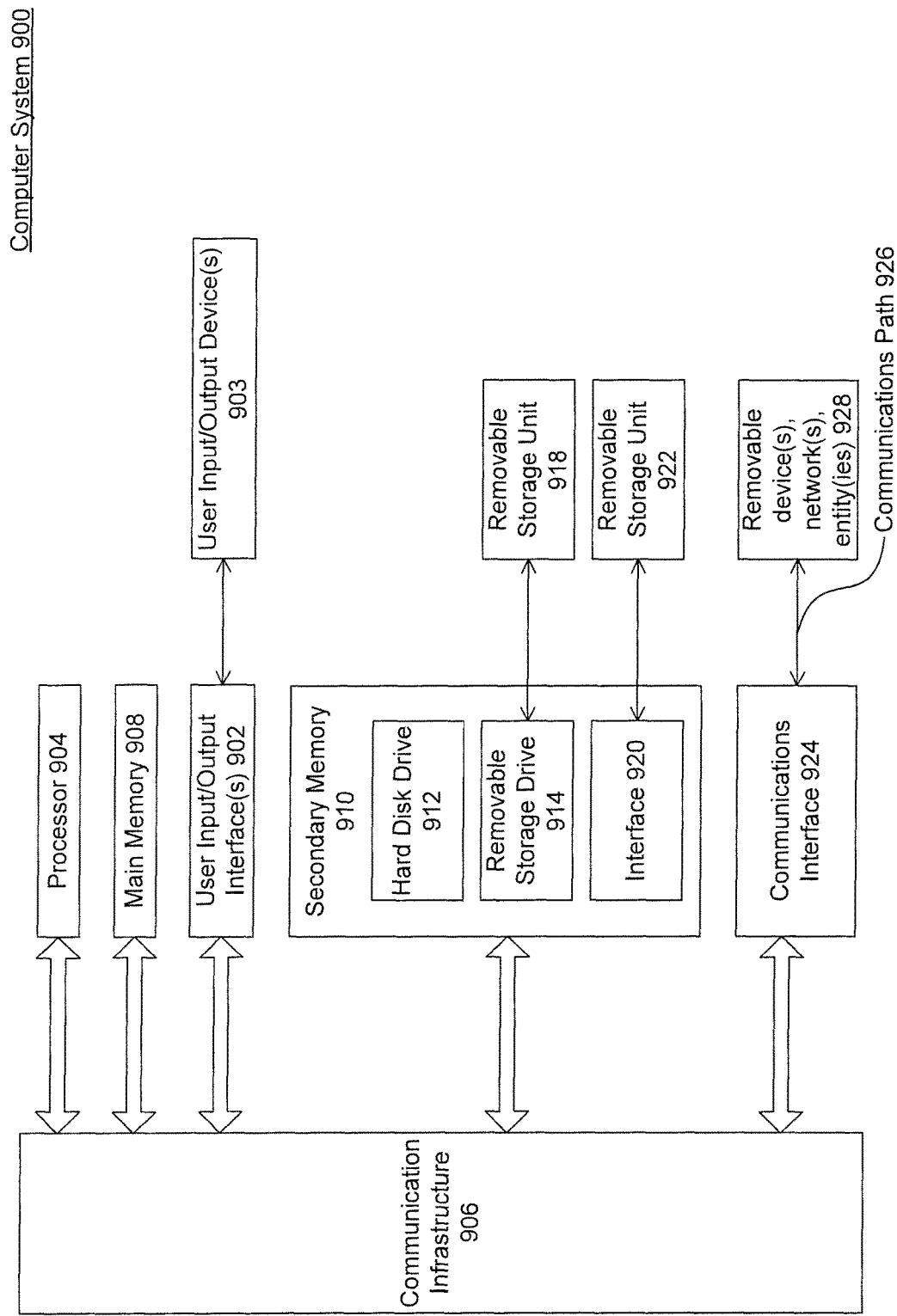
FIG. 9 is an exemplary computing device where various embodiments can be implemented.

In an embodiment, media device 102 may include computer hardware, including a memory, a processor and a communication interface, as well as combinations and/or sub-combinations thereof, that are described, for example, in detail in FIG. 9.

In an embodiment, media device 102 receives and/or displays media content 104. Media content 104 may be one or more of text, audio, still images, video, etc. In a further embodiment, media content 104 may be streaming content. Example streaming content includes multimedia content, such as, movies, television episodes, advertisements, commercials, news, streaming channels, video clips, video games, on-demand video content, music, and photos organized into a video enhanced photo album. Example streaming content also includes audio and Internet content, to name a few examples.

In an embodiment, media device 102 utilizes one or more networks, collectively referred to as network 106. In an embodiment, media device 102 obtains media content 104 using network 106. There may be multiple media devices 102 connected to network 106. In an embodiment, network 106 may be a wired and/or wireless network, including a network having interconnected computer networks, referred collectively as the Internet. In an embodiment, network 106 may include private, public, academic, business, and government networks that includes access to extensive amounts of information and resources. Network 106 may also include cellular and/or other communication mediums.

In an embodiment, content server 108 is also connected to network 106. Content server 108 stores, accesses, processes, and/or distributes media content 104 over network 106 to, for example, media devices 102. To store media content 104, content server 108 may interface with database storage 110. Database storage 110 includes non-volatile storage discussed in FIG. 9, that is conducive to storing large amounts of information, including, media content 104.

In an embodiment, content sources 112 provide media content 104 to content server 108. Content sources 112 generate, distribute, process, and/or otherwise provide media content 104 to content server 108 for eventual distribution and viewing using media devices 102. For example, content sources 112 may transmit media content 104 via network 106 to content server 108 and database storage 110. Media content 104 may then be distributed to media devices 102. In an embodiment, media device 102 may request media content 104 from content server 108. When content server 108 receives a request for media content 104, content server 108 may retrieve media content 104 and provide media content 104 to media device 102. For example, content server 108 may request media content 104 from database storage 110 or content source 112. Once content server 108 receives the requested media content 104 from database storage 110 or content source 112, content server 108 transmits media content 104 to media device 102.

In an embodiment, media content 104 may or may not be trick mode enabled. A trick mode is an ability to fast forward, rewind, pause, or otherwise manipulate media content 104 during viewing at one or more speeds. Content source 112 may determine whether media content 104 is trick mode enabled. For example, content source 112 may generate a trick mode file that stores trick mode data before media content 104 is distributed to content server 108 and streamed using media device 102. A non-limiting example of trick mode data is a chronological timeline made up of image frames that correspond to distinct frames in media content 104. The timeline may be at predefined or variable time intervals. These image frames may be reduced in size from a corresponding frame included in media content 104. Content source 112 may then store the trick mode data in a trick mode file, or as part of, or together with, media content 104 at a location accessible to content server 108.

When media device 102 requests media content 104, content server 108 transmits the requested media content 104 as well as the associated trick mode data to media device 102. The transmission of trick mode data may be out-of-band from media content 104, so that the transmission does not affect streaming or download of media content 104. Example out-of-band transmission may be transmission before media content 104 is streamed to media device 102 or when media content 104 is paused as it is streamed, etc. When media device 102 receives a trick mode request (such as a request from a viewer to rewind or fast forward), media device 102 accesses the trick mode data and uses the trick mode data to perform trick mode operations (i.e., the requested rewind or fast forward, for example) on media content 104.

In an embodiment where media content 104 is not trick-mode enabled, conventional media devices cannot perform trick mode operations on media content 104. In an embodiment, media device 102 is able to dynamically generate trick mode data from media content 104 as media content 104 is being streamed from content server 102 to media device 102. Once media device 102 dynamically generates trick mode data, media device 102 uses the generated trick mode data to perform trick mode operations on media content 104.

Figure 2:
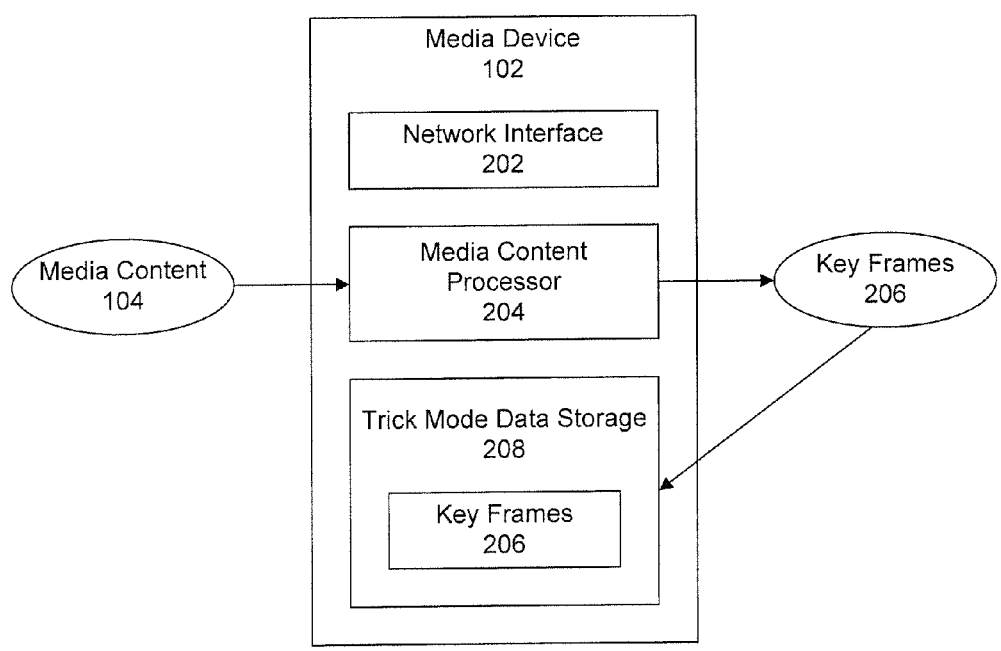
FIG. 2 is a block diagram of a media device generating trick mode data, according to an embodiment.

FIG. 2 is a block diagram 200 of a media device generating trick mode data from streaming media content, according to an embodiment. Block diagram 200 includes media device 102. In an embodiment, media device 102 includes a network interface 202. Network interface 202 includes a receiver and a transmitter which allow media device 102 to communicate with network 106. For example, a transmitter may transmit a request for media content 104 to content server 108 and a receiver may receive media content 104 from content server 108. In another example, network interface 202 may include an application interface or an API that formats requests for media content 104 and receives media content 104.

In an embodiment, media device 102 may include a media content processor 204. Media content processor 204 dynamically generates trick mode data as media device 102 receives and/or streams media content 104. In one embodiment, to generate trick mode data, media content processor 204 retrieves key frames 206 from media content 104 when, for example, media device 102 streams media content 104. Key frames 206 are used to generate trick mode data and may be the same or different frames in media content 104 as the frames in the encoded video data.

Media content processor 204 may identify, select, and/or retrieve key frames 206 at predefined time intervals and/or variable time intervals and store key frames 206 as trick mode data in the trick mode data storage 208. Trick mode data storage 208 may be a volatile or non-volatile storage on or coupled to media device 102, and may be one of the storages described in FIG. 9. In another embodiment, media content processor 204 may use network interface 202 to upload key frames 206 to content server 108. Content server 108 then stores key frames 206 as trick mode data in database storage 110, and transmits the trick mode data to one or more media devices 102 upon request. In an alternative embodiment, the foregoing operations may be performed on a previously streamed media content that is stored in media device 102.

As discussed above, media content processor 204 retrieves key frames 206 at predetermined time intervals. Example time intervals may be 10 or 20 seconds. Each key frame may be tagged, or otherwise correspond, to an actual location of a frame in media content 104 or the time from the beginning of media content 104.

In an embodiment, media content processor 204 may use key frames 206 to generate trick mode data. For example, media content processor 204 may select all or a subset of key frames 206 and store them in a chronological order in a trick mode file or volatile memory storage that exists as long as media content 104 is streamed to media device 102 and/or for a predefined period thereafter. Media content processor 204 may also append the trick mode data with more key frames 206 as media device 102 continues to stream media content 104. In a further embodiment, media content processor 204 may also convert key frames 206 to a different format, if needed. For example, media content processor 204 may compress key frames 206 from the format of media content 104 which is used to display media content 104 to another less memory intensive format. In another example, media device 102 may receive portions of media content 104, where each portion is in a different format. Media content processor 204 retrieves key frames 206 from the portions of media content that media device 104 received in different formats, and converts key frames 206 to a common format.

As media content 104 streams to media device 102, a user may activate trick mode. For example, a user may use a remote control, a smartphone acting as a remote control, or one or more selections or buttons on media device 102 to activate pause, rewind, or fast forward functions at one or more speeds. Such operations are called trick mode operations since they involve trick mode data. When a viewer activates a trick mode on media device 102, media content processor 204 may identify a key frame in the trick mode data storage 208 or a trick mode data file that is located approximately at the location where the viewer was viewing media content 104 when the trick mode was activated. Media device 102 then uses trick mode data to perform the trick mode operation.

In another embodiment, as media content 104 streams to media device 102, media content processor 204 may identify key frames 206 based on characteristics of frames in media content 104. For example, media content 104 may be encoded using key frames and non-key frames, as illustrated using FIG. 3, below.

Figure 3:
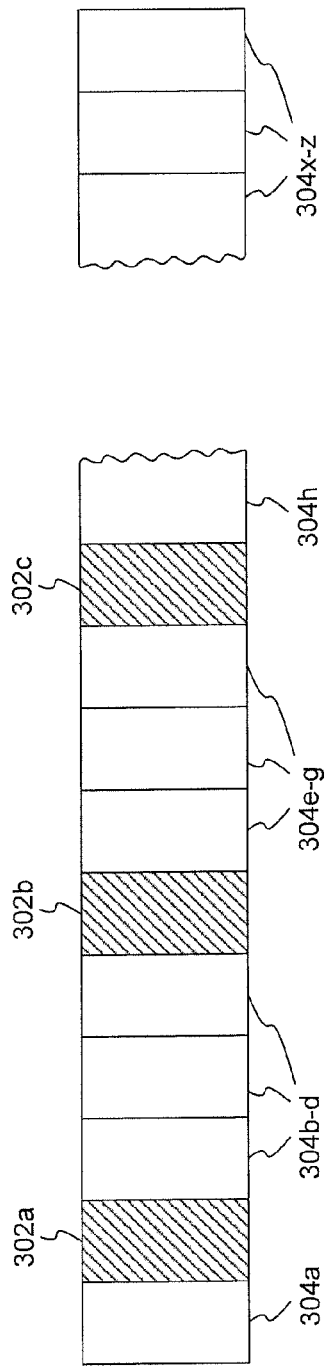
FIG. 3 is a block diagram of a media content stream, according to an embodiment.

FIG. 3 is a block diagram of a media stream 300 according to an embodiment. Media stream 300 can be media content 104 that is streamed to media device 102. In an embodiment, media stream 300 is divided into key frames 302a-c and non-key frames 304a-z. Key frames 302a-c and non-key frames 304a-z differ in encoding. For example, key frames 302a-c in media content 104 may be encoded without reference to other frames, such as non-key frames 304a-z, and represent a complete frame or an image without relying on preceding or subsequent frames. Non-key frames 304a-z, on the other hand, do not represent a complete image. Instead, non-key frames 304a-z may represent changes or deltas between non-key frames 304a-z and key frames 302a-c. For example, non-key frame 304a is combined with a corresponding key frame 302a to generate a complete image that is shown using media device 102. As shown in FIG. 3, there may be multiple non-key frames, such as, non-key frames 304b-d between key frames, such as key frames 302a and 302b.

In a further embodiment, key frames 302a-c may include an identifier or a descriptor which identifies the frames as key frames 302a-c, and non-key frames 304a-z may include an identifier or a descriptor which identifies the frames as non-key frames 304a-z.

Going back to FIG. 2, media content 104 may be encoded using different compression/decompression or CODEC techniques. Example CODEC techniques include H.264, MPEG2, H.265, etc., and all are well-known in the art. In a further embodiment, media content 104 may also be streamed from content server 108 to media device 102 using HTTP Live Streaming, etc. Also, in some embodiments, different portions of media content 104 may be physically stored on different content servers 108 and also may be encoded using different CODEC techniques when the portions of the media content 104 are delivered to media device 102.

In an embodiment, media content 104 or a portion of a media content 104 encoded and/or delivered using different CODEC and delivery techniques is media stream 300 described in FIG. 3. In an embodiment, when media content processor 204 receives and/or displays media content 104, media content processor 204 extracts key frames 302a-c from media content 104. Media content processor 204 then stores some or all key frames 302a-c in trick mode data storage 208. In a further embodiment, media content processor 204 may select key frames 302a and 302c when media content processor 204 determines that the time interval between key frame 302a and 302c is greater than a predetermined time interval, but the time interval between key frames 302a and 302b is less than the predefined time interval. Generally, media content processor 204 selects key frames for inclusion into trick mode data such that the selected key frames form trick mode data that is sufficient to perform trick mode operations. Media content processor 204 then stores the selected key frames, such as, key frames 302a and 302c in, for example, trick mode file and/or trick mode storage 208.

Going back to FIG. 2, in an embodiment, media content processor 204 may also reformat key frames 206. For example, media content processor 204 may transcode key frames 206 into a different format that is efficient for storing trick mode data and takes up less memory space than the frames in media content 104. Example transcoding may include scaling, changing encoding format, or adding visual enhancements to key frames 206. In a further embodiment, key frames 206 may also be selected and saved in a way that optimizes the spacing between key frames 206, such that the spacing between the frames is consistent throughout media content 104.

In a further embodiment, multiple media devices 102 may identify key frames 206 for the same media content 104. For example, when media content 104 is streamed to multiple media devices 102, each media device identifies key frames 206 from in media content 104. In this way, multiple media devices 102 generate trick mode data for the same media content 104. The generated trick mode data may then be combined using content server 108, another server, or media device 102, in a crowd-sourcing type embodiment.

Figure 4:
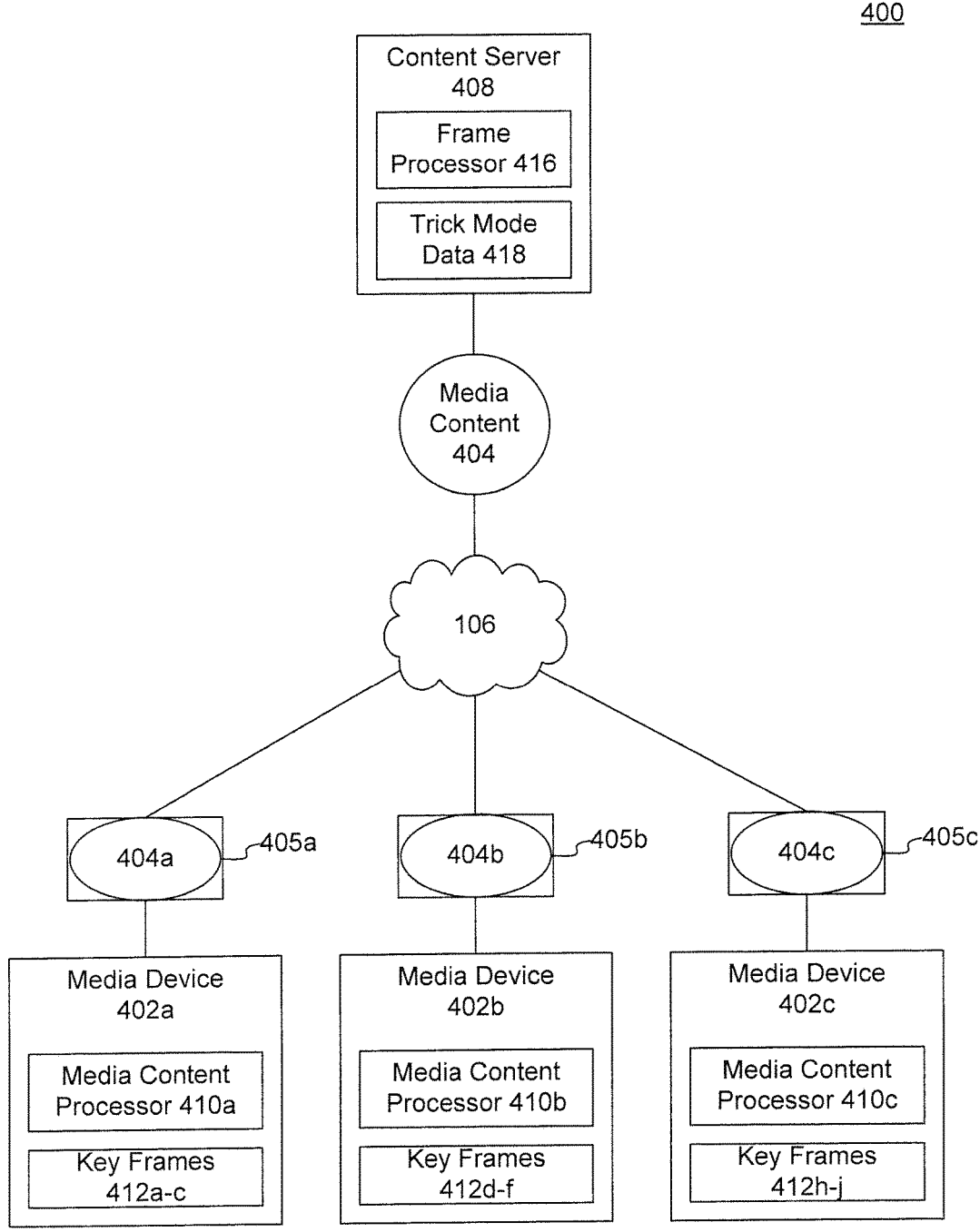
FIG. 4 is a block diagram of a system including multiple media devices generating trick mode data from the same media content, according to an embodiment.

FIG. 4 is a block diagram of a system 400 including multiple media devices generating trick mode data from the same media content, according to an embodiment. For example, multiple media devices 402a-c receive the same media content 404 from content server 408. Content server 408 delivers media content 404 at the same or different times to media devices 402a-c, or delivers different portions of media content 404 to media devices 402a-c. For example, media device 402a may receive media content 404a, media device 402b may receive media content 404b, and media device 402c may receive media content 404c. Media content processors 410a-c process the respective media content 404a-c on media devices 402a-c as media content 404a-c is streamed from content server 408. For example, media content processor 410a retrieves key frames 412a-c, media content processor 410b retrieves key frames 412d-f, and media content processor 410c retrieves key frames 412h-j. Notably, key frames 412a-c, 412d-f, and 412h-j (even when corresponding to the same content) may be the same or different key frames, as they are generated on different media devices 402a-c.

In an embodiment, media content 404a-c may be transmitted to each of media devices 402a-c in a different format, such that media device 402a receives media content 404a in format 405a, media device 402b receives media content 404b in format 405b, and media device 402c receives media content 404c in format 405c.

In an embodiment, media devices 402a-c may store key frames 412a-c, 412d-f, and 412h-j in the respective trick mode data storages 414a-c of the respective media device 402a-c. In another embodiment, media devices 402a-c may transmit key frames 412a-c, 412d-f, and 412h-j to content server 408 or another crowd sourcing server.

In an embodiment, content server 408 also includes a frame processor 416. Frame processor 416 receives key frames 412a-c, 412d-f, and 412h-j from media devices 402a-c, and selects some or all key frames 412a-c, 412d-f, and 412h-j for inclusion into trick mode data. For example, frame processor 416 may identify a location of each one of key frames 412a-c, 412d-f, and 412h-j in media content 404 and selects some or all key frames 412a-c, 412d-f, and 412h-j as trick mode data. Frame processor 416 may select key frames 412a-c, 412d-f, and 412h-j based on the key frames' 412a-c, 412d-f, and 412h-j locations in media content 404 as well as key frames' location from each other. For example, frame processor 416 may select key frames for inclusion into trick mode data, such that key frames 412a-c, 412d-f, and 412h-j are located at predefined time intervals from each other.

For example, suppose key frame 412a-c, 412d-f, and 412h-j occur in media content 404 at a time as shown in a table below:

TABLE 1

| Frame | Time |
| --- | --- |
| 412a | 30 minutes, 10 seconds |
| 412b | 30 minutes, 40 seconds |
| 412c | 31 minutes, 10 seconds |
| 412d | 30 minutes, 20 seconds |
| 412e | 30 minutes, 30 seconds |
| 412f | 30 minutes, 40 seconds |
| 412h | 45 minutes, 10 seconds |
| 412i | 45 minutes, 20 seconds |
| 412j | 45 minutes, 30 seconds |

In an embodiment where frame processor 416 selects a key frame every 10 seconds, frame processor 416 may select key frames 412a, 412d, 412e, 412f, 412c and 412h-j. In another embodiment where frame processor 416 selects a key frame every 20 seconds, frame processor 416 may select key frames 412a, 412e, 412c, 412h, and 412j. Frame processor 416 stores the selected key frames, such as key frames 412a, 412e, 412h, and 412j in chronological order as trick mode data 418, using, for example, trick mode data file or another form of storage. In an embodiment, content server 408 may store trick mode data 418 in a memory included or coupled to content server 408.

In a further embodiment, media content processors 410a-c may also select some or all key frames from the respective key frames 412a-c, 412d-f, and 412h-j, as described above, before transmitting the selected key frames to content server 408.

In an embodiment, either media content processors 410a-c or frame processor 416 may also modify the format of key frames 412a-c, 412d-f, and 412h-j as discussed above, such that key frames included in trick mode data 418 are in the same format.

In an embodiment, when media device 402a receives a trick mode request from a viewer, media device 402a may transmit the trick mode request (or a request for trick mode data relating to the rick mode request) to content server 408. In response to the request, content server 408 may transmit trick mode data 418 to media device 402a. Once received, media device 402a implements the trick mode operation using the received trick mode data 418.

Figure 5:
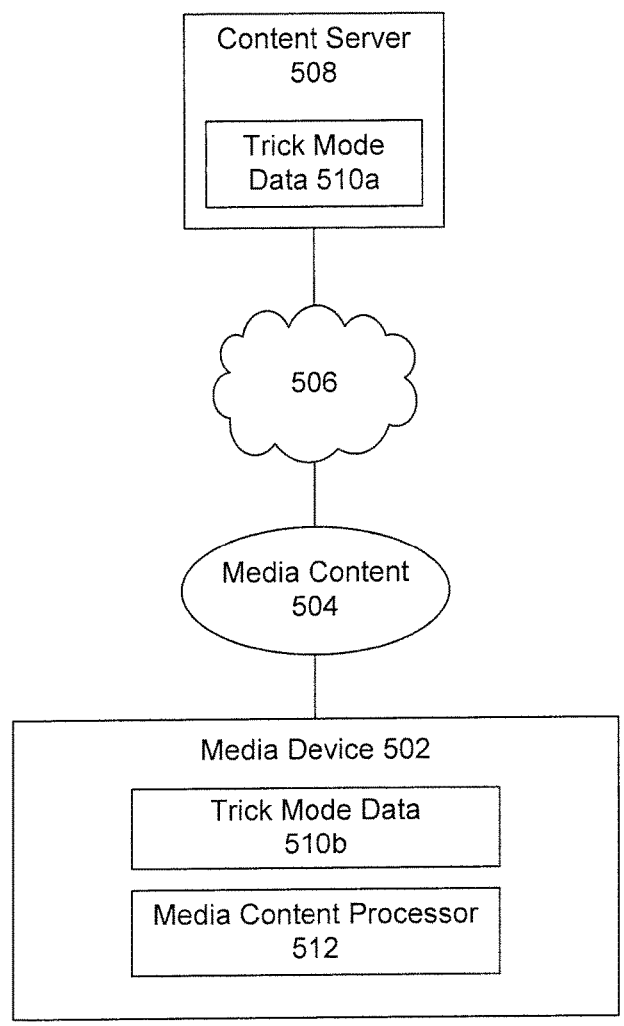
FIG. 5 is a block diagram of a system where a media device performs a trick mode operation using trick mode data, according to an embodiment.

FIG. 5 is a block diagram of a system 500, where a media device performs a trick mode operation using trick mode data, according to an embodiment. In system 500, a trick mode operation may be performed using trick mode data obtained on a media device 502 and/or content server 508 via network 506.

For example, trick mode data 510a may be obtained as described in FIG. 4 and stored in memory included or coupled to content server 508. Media device 502 may stream media content 504 and dynamically generate trick mode data 510b. In another embodiment, trick mode data 510b may also be downloaded to media device 502 out-of-band from media content 504, and stored in the memory included in media device 502.

When a viewer initiates a trick mode operation, media device 502 may use a combination of trick mode data 510a and 510b to perform the trick mode operation. For example, media device 502 may use trick mode data 510b to perform a rewind operation. And, media device 502 may use trick mode data 510a to perform a fast forward operation when trick mode data 510a includes portions of media content 504 that has not yet been streamed to media device 502 and are not available using trick mode data 510b. In this embodiment, when media device 502 receives a fast forward request, media device 502 determines whether trick mode data 510b includes key frames that are beyond the point in time where media content 504 has been streamed to media device 502, and requests trick mode data 510a from content server 508. Once media device 502 receives trick mode data 510a, which may be out-of-band with media content 504, media content processor 512 identifies the location in trick mode data 510a from where to begin the fast forward operation, and performs the fast forward operation using trick mode data 510a. In a non-limiting embodiment, media content processor 512 may identify the location in trick mode data from where to perform the fast forward operation by comparing the identifier of a key or non-key frame in media content 504 when trick mode operation was requested to an identifier of a frame in trick mode data 510a.

In yet another embodiment, media device 502 may receive a pause request from a viewer. In response, media device 502 may pause the viewing of media content 504. To pause media content 504, media device 502 may continue to stream media content 504 but also temporarily store media content 504 received after the pause request in the memory (such as volatile cache memory) of media device 502. In this way, the pause functionality may be transparent to content server 508.

In an embodiment, media device 102 may continue to generate trick mode data during the pause. For example, while media device 502 pauses media content 504, media content processor 512 may continue to retrieve key frames from media content 504 and store these key frames as trick mode data 510b. In this way, when media device 502 receives a fast forward trick mode command, media device 502 may use trick mode data 510b, or a combination of trick mode data 510a and 510b to perform a fast forward operation. In yet, another embodiment, media device 502 may use trick mode data 510b to perform a rewind operation.

Figure 6:
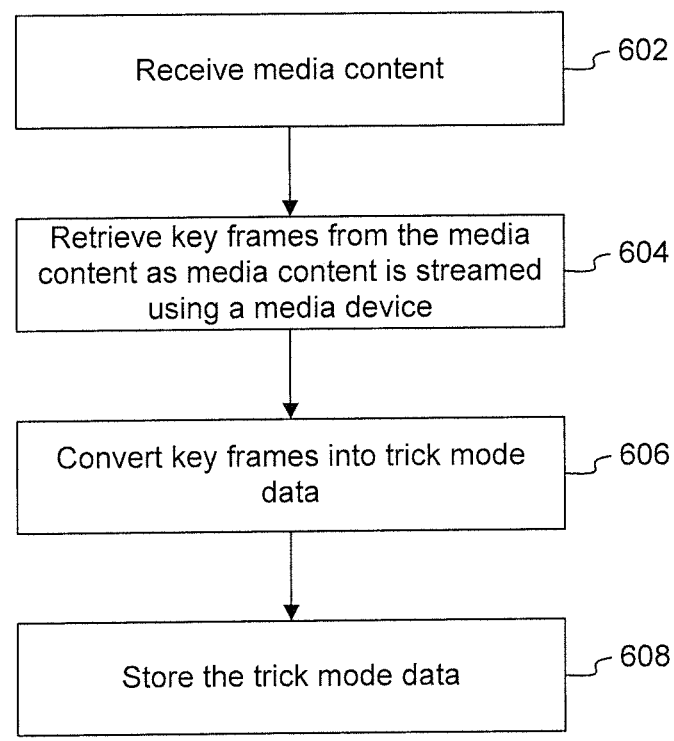
FIG. 6 is a flowchart of a method for dynamically generating trick mode data, according to an embodiment.

FIG. 6 is a flowchart of a method 600 for dynamically generating trick mode data, according to an embodiment.

At operation 602, a media device receives media content. For example, network interface 202 receives media content 104 from content server 108. As discussed above, media content 104 can be streaming video content which media device 102 streams and displays in real-time.

At operation 604, key frames are identified. For example, as media device 102 streams media content 104, media content processor 204 identifies key frames 206. As discussed above, media content processor 204 may identify key frames 206 based on predetermined or variable time intervals. As also discussed above, media content processor 204 may identify key frames 206 as frames in media content 104 that generate an image independent of other frames.

At operation 606, key frames are converted into trick mode data. For example, media content processor 204 converts key frames 206 from the format associated with media content 104 into a trick mode format. To convert key frames 206, media content processor 204 may convert a key frame into a different format and/or select a subset of key frames 206 such that trick mode data includes key frames in chronological order and at predefined or variable time intervals.

At operation 608, trick mode data is stored. For example, media content processor 204 stores trick mode data in trick mode data storage 208 or uploads the trick mode data to content server 108.

Figure 7:
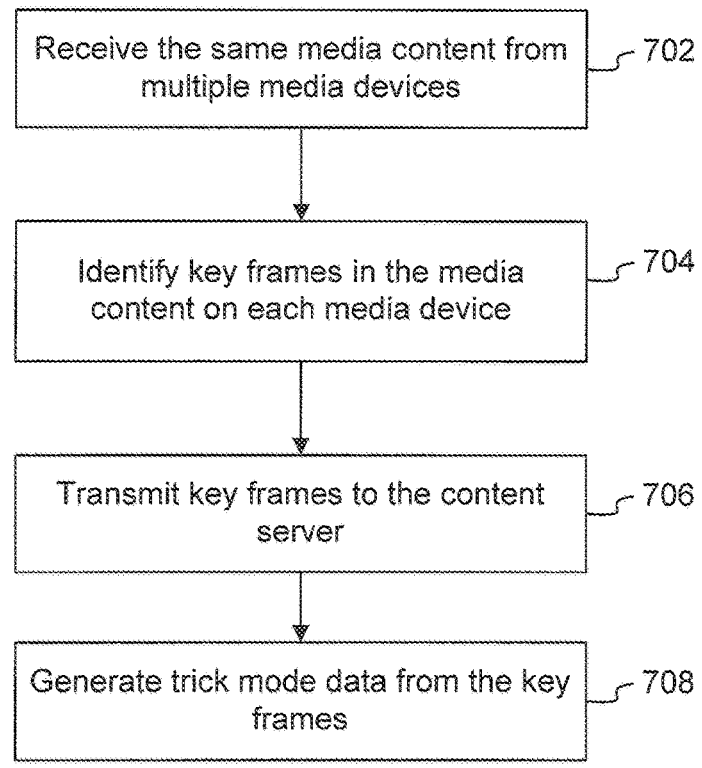
FIG. 7 is a flowchart of a method for dynamically generating trick mode data, according to an embodiment.

FIG. 7 is a flowchart of a method 700 for dynamically generating trick mode data, according to an embodiment.

At operation 702, multiple media devices receive the same media content. For example, media devices 402a-c receive media content 404a-c from content server 108, where media content 404a-c is the same media content 404.

At operation 704, each media device identifies key frames. For example, media device 402a identifies key frames 412a-c, media device 402b identifies key frames 412d-f, and media device 402c identifies key frames 412h-j, which may be the same or different key frames.

At operation 706, each media device transmits its respective key frames to a content server or another crowd server. For example, media device 402a transmits key frames 412a-c to content server 408, media device 402b transmits key frames 412d-f to content server 408, and media device 402c transmits key frames 412h-j to content server 408. Prior to transmission, media devices 402a-c may also convert the respective key frames 412a-c, 412d-f, and 412h-j to a different format, as described above.

At operation 708, the content server converts the key frames into trick mode data. For example, frame processor 416 selects a subset of key frames from key frames 412a-c, 412d-f, and 412h-j as trick mode data 418. Frame processor 416 may also change the key frames selected as trick mode data 418 into a common format and store trick mode data 418.

Figure 8:
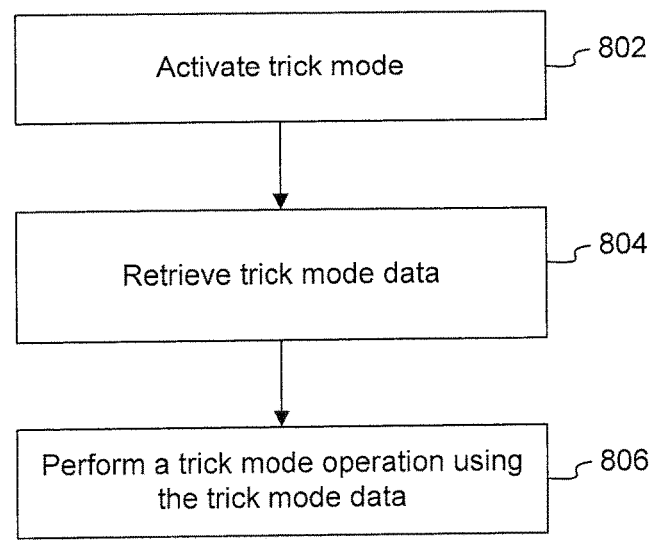
FIG. 8 is a flowchart of a method for performing a trick mode operation, according to an embodiment.

FIG. 8 is a flowchart of a method 800 for performing a trick mode operation, according to an embodiment.

At operation 802, a trick mode is activated. For example, media device receives a request from a user to perform a trick mode operation.

At operation 804, media device accesses or retrieves trick mode data. For example, media device 502 may retrieve trick mode data 510b stored within media device 502, or retrieve trick mode data 510a from content server 508. In an embodiment, media device 502 may retrieve trick mode data 510a when media content processor 512 determines that the requested trick mode operation cannot be performed using trick mode data 510b.

At operation 806, a trick mode operation is performed. For example, media device 502 performs the trick mode operation using the trick mode data 510a, 510b, or 510a-b.

Various embodiments can be implemented, for example, using one or more well-known computer systems or one or more components included in computer system 900 shown in FIG. 9. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/or any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
receiving media content on a media device from a content server;
identifying a plurality of key frames from the media content as the media content is streamed using the media device;
converting the plurality of key frames into trick mode data during the streaming, wherein at least the trick mode data is used to execute a trick mode operation on the media content, and the trick mode data includes at least one image frame that corresponds to at least one key frame from the media content; and
uploading the trick mode data to the content server, whereby at least some of the trick mode data is provided to a second media device.

2. The method of claim 1, wherein the identifying further comprises:
selecting the plurality of key frames at predetermined time intervals, such that the trick mode data includes an image frame that corresponds to a key frame in a predefined time interval.

3. The method of claim 1, wherein the converting further comprises reducing size of the plurality of key frames.

4. The method of claim 1, wherein a key frame in the plurality of key frames forms a complete image in the media content.

5. The method of claim 1, wherein the media content is streaming media content and is streamed from the content server over a network as the media content is displayed using the media device.

6. The method of claim 1,
whereby the content server provides at least some of the trick mode data to the second media device requesting a trick mode operation.

7. The method of claim 1, further comprising:
pausing the media content; and
generating the trick mode data during the pausing.

8. The method of claim 7, further comprising:
storing the media content during the pausing, wherein during the pausing the media content continues to stream to the media device; and
wherein the generating further comprises identifying a key frame from the stored media content.

9. A media device comprising:
a network interface configured to receive media content on the media device from a content server; and
a processor configured to:
identify a plurality of key frames from the media content as the media content is streamed using the media device;
convert the plurality of key frames into trick mode data during the streaming, wherein the trick mode data is used to execute a trick mode operation on the media content, and the trick mode data includes at least one image frame that corresponds to at least one key frame from the media content; and
upload the trick mode data to the content server, whereby at least some of the trick mode data is provided to a second media device.

10. The media device of claim 9, wherein to identify the plurality of frames the processor is further configured to select the plurality of key frames at predetermined time intervals, such that the trick mode data includes an image frame that corresponds to a key frame in a predetermined time interval.

11. The media device of claim 9, wherein to convert the plurality of key frames, the processor is further configured to reduce size of the plurality of key frames.

12. The media device of claim 9, wherein a key frame in the plurality of key frames forms a complete image in the media content.

13. The media device of claim 9, wherein the media content is streaming media content and is streamed from the content server over a network as the media content is displayed using the media device.

14. The media device of claim 9,
whereby the content server provides at least some of the trick mode data to the second media device requesting a trick mode operation.

15. The media device of claim 9, wherein the processor is further configured to:
pause the media content; and
generate the trick mode data while the media content is paused.

16. The media device of claim 15, wherein the processor is further configured to:
store the media content while the media content is paused in one or more memories coupled to the processor, wherein while the media content is paused the network interface continues to receive the media content on the media device; and
identify a key frame for inclusion into the trick mode data from the stored media content.

17. A system, comprising:
a first media device configured to receive media content from a content server;
a first processor coupled to the first media device configured to identify a first key frame, and upload the first key frame to the content server;
a second media device configured to receive the media content from the content server; and
a second processor coupled the second media device configured to identify a second key frame and upload the second key frame to the content server,
whereby the content server generates trick mode data for the media content from the first key frame and the second key frame, wherein the generated trick mode data includes a first image frame and a second image frame that correspond to the first key frame and the second key frame.

18. The system of claim 17, wherein the first media device receives the media content in a first format and converts the media content into a third format, and wherein the second media device receives the media content in a second format and coverts the media content into the third format.

19. The system of claim 17, wherein the media content is streaming media content.

20. The system of claim 17, wherein the first media device receives the trick mode data in response to a request to perform a trick mode operation.

* * * * *